United States Patent Office 3,579,460
Patented May 18, 1971

3,579,460
SULFENAMIDE COMPOSITIONS STABILIZED BY ORGANIC DISULFIDES
Joseph Edward Kerwood, 2886 Burr Oak Drive, Akron, Ohio 44313
No Drawing. Filed June 16, 1969, Ser. No. 833,736
Int. Cl. C08d 11/02
U.S. Cl. 252—182
15 Claims

ABSTRACT OF THE DISCLOSURE

A composition comprising a thiazolesulfenamide accelerator and a sulfenamide prevulcanization inhibitor can be stabilized by the addition of an organic disulfide of the formula T—S—S—T wherein T independently is lower alkyl, aralkyl, aryl, alkenyl or a 2-thiazolyl radical.

BACKGROUND OF THE INVENTION

This invention relates to the stabilization of mixtures of thiazolesulfenamide accelerators and sulfenamide inhibitors of premature vulcanization. More particularly, this invention relates to the use of certain organic disulfides as a stabilizer for mixtures of thiazolesulfenamide accelerators and sulfenamide inhibitors of premature vulcanization.

In the manufacture of vulcanized rubber products, premature vulcanization is a major problem which has been overcome or greatly reduced by the invention described in Coran and Kerwood application Ser. No. 714,445, filed Mar. 20, 1968. The aforesaid application teaches that compounds containing the characteristic nucleus

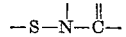

inhibit prevulcanization of vulcanizable rubber containing a sulfenamide accelerator and that the prevulcanization inhibitor also stabilizes the sulfenamide but is sacrificed in the role of either stabilizer or inhibitor meaning that it is consumed in the process of performing either function. In a mixture of sulfenamide accelerator and inhibitor intended for use to prevent prevulcanization, loss of inhibitor is objectionable. The present invention provides a means of reducing or minimizing this loss.

OBJECTS OF THE INVENTION

An object of this invention is to provide a stabilized mixture of sulfenamide accelerator and prevulcanization inhibitor. Another object of this invention is to achieve long shelf life for mixtures of sulfenamide accelerators and prevulcanization inhibitors. A further object of this invention is to reduce the consumption of prevulcanization inhibitor when blended with sulfenamide accelerators. A further object of this invention is to provide a method to prevent decomposition or deterioration of mixtures of sulfenamide accelerators and sulfenamide prevulcanization inhibitors during storage.

SUMMARY OF THE INVENTION

The foregoing and other objects are accomplished by the addition of certain organic disulfides to mixtures of prevulcanization inhibitor and sulfenamide accelerator. I have discovered that the addition of an organic disulfide of the formula T—S—S—T where T independently is lower alkyl, aralkyl, aryl, alkenyl, or a 2-thiazolyl radical to a mixture of sulfenamide accelerator and prevulcanization inhibitor stabilizes the composition and prevents or reduces loss of inhibitor. Alkyl may contain 1–20 carbon atoms, aryl may be phenyl, naphthyl, xylyl, or xenyl, alkenyl may also contain 1–20 carbon atoms and thiazolyl is preferably 2-benzothiazolyl. The aforesaid radicals may contain certain substituents, for example, halogen which do not significantly affect the stabilizing properties. Examples of T are methyl, ethyl, propyl, isopropyl, butyl, amyl, octyl, dodecyl, allyl, 2-chloroallyl, 2-butenyl, 3-chloro-2-butenyl, phenyl, tolyl, naphthyl, o-chlorophenyl, m-chlorophenyl, p-chlorophenyl, p-tert-butylphenyl, benzyl, phenethyl, p-chlorobenzyl, trichlorobenzyl, benzothiazolyl, 5-chlorobenzothiazolyl, 4-methylbenzothiazolyl, 6-ethoxybenzothiazolyl, and 6-phenylbenzothiazolyl.

DESCRIPTION OF VARIABLES

The addition of the aforesaid organic disulfide greatly reduces the consumption of the inhibitor during storage which results in longer shelf life for the accelerator-inhibitor compositions. The period of usefulness for the sulfenamide accelerator-sulfenamide prevulcanization inhibitor compositions is thus greatly extended.

Typical examples of disulfides which stabilize the prevulcanization inhibitors of this invention are methyl disulfide, ethyl disulfide, propyl disulfide, isopropyl disulfide, butyl disulfide, amyl disulfide, isoamyl disulfide, octyl disulfide, dodecyl disulfide, allyl disulfide, 2-chloroallyl disulfide, 2-butenyl disulfide, bis(3-chloro-2-butenyl)disulfide, phenyl disulfide, bis(o-chlorophenyl)disulfide, bis-(m-chlorophenyl)disulfide, bis(p-chlorophenyl)disulfide, bis(p-tert-butylphenyl)disulfide, tolyl disulfide, naphthyl disulfide, benzyl disulfide, bis(p-chlorobenzyl)disulfide, bis(trichlorobenzyl)disulfide, benzyl methyl disulfide, benzyl ethyl disulfide, benzyl hexyl disulfide, benzyl p-tolyl disulfide, phenylethyl disulfide, 2,2'-dibenzothiazyl disulfide, bis(5-chlorobenzothiazyl) disulfide, bis(4-methylbenzothiazyl)disulfide, bis(6-ethoxybenzothiazyl)disulfide, bis(6-phenylbenzothiazyl) disulfide, 2,2-dithio-bis (dihydrothiazole), 2,2 - dithio - bis(4,5 - dimethyldihydrothiazole), 2,2-dithio-bis(4-ethylthiazole), 2,2-dithio-bis(4-cyclohexylthiazole), 2,2-dithio-bis(4,5-dimethylthiazole), 2,2-dithio-bis-6,7-dihydro-4,5-benzobenzothiazole.

The sulfenamide prevulcanization inhibitor suitable for the practice of this invention is any selected from the group consisting of the formulas:

(a) 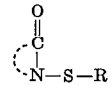

wherein

is a radical derived by removal of hydrogen from an imide of a dicarboxylic acid, from a monocarbonyl cyclic urea, and from a monocarbonyl azole containing one other different hetero atom in the ring, and R is aryl, secondary alkyl, tertiary alkyl or cycloalkyl, (b) 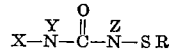

where X, Y, and Z individually are hydrogen, R, or SR, R having the same meaning as before, and (c) 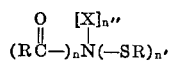

where $n$, $n'$ and $n''$ are integers, the sum of which is three, $n$ and $n'$ being one or two, and $n''$ being zero or one, and R and X having the same meaning as before.

Examples of the prevulcanization inhibitors suitable for the practice of this invention are N-(cyclohexylthio)phthalimide,
N-(cyclopentylthio)phthalimide,
N-(cyclododecylthio)phthalimide, N-(cyclooctylthio)phthalimide,
N-(benzylthio)phthalimide,
N-(t-butylthio)phthalimide,
N-(isobutylthio)phthalimide,
N-(sec.-butylthio)phthalimide,
N-(cyclohexylthio)adipimide,
N-(cyclopentylthio)adipimide,
N-(cyclododecylthio)adipimide,
N-(cyclooctylthio)adipimide,
N-(benzylthio)adipimide,
N-(isopropylthio)adipimide,
N-(t-butylthio)adipimide,
N-(isobutylthio)adipimide,
N-(sec.-butylthio)adipimide,
N-(phenylthio)adipimide,
N-(tolylthio)adipimide,
N-(cyclohexythio)glutarimide,
N-(cyclooctylthio)glutarimide,
N-(cyclopentylthio)glutarimide,
N-(cyclododecylthio)glutarimide,
N-(benzylthio)glutarimide,
N-(isopropylthio)glutarimide,
N-(t-butylthio)glutarimide,
N-(isobutylthio)glutarimide,
N-(sec.-butylthio)glutarimide,
N-(phenylthio)glutarimide,
N-(tolylthio)glutarimide,
N-(cyclohexylthio)-3,3-dimethylglutarimide,
N-(cyclooctylthio)-3,3-dimethylglutarimide,
N-(cyclopentylthio)-3,3-dimethylglutarimide,
N-(cyclododecylthio)-3,3-dimethylglutarimide,
N-(benzylthio)-3,3-dimethylglutarimide,
N-(isopropylthio)-3,3-dimethylglutarimide,
N-(t-butylthio)-3,3-dimethylglutarimide,
N-(isobutylthio)-3,3-dimethylglutarimide,
N-(sec.-butylthio)-3,3-dimethylglutarimide,
N-(phenylthio)-3,3-dimethylglutarimide,
N-(tolylthio)-3,3-dimethylglutarimide,
N-(cyclohexylthio)-7-oxabicyclo[2.2.1]heptane-2,3-dicarboximide,
N-(cyclohexylthio)-7-oxabicyclo[2.2.1]hept-5-ene-2,3-dicarboximide,
N-(cyclohexylthio)hexahydrophthalimide,
1,3-bis(cyclohexylthio)-2-imidazolinone,
1,3-bis(cyclooctylthio)-2-imidazolinone,
1,3-bis(phenylthio)-2-imidazolinone,
1,3-bis(chlorophenylthio)-2-imidazolinone,
1,3-bis(benzylthio)-2-imidazolinone,
1,3-bis(tolylthio)-2-imidazolinone,
1,3-bis(nitrophenylthio)-2-imidazolinone,
1,3-bis(isopropylthio)-2-imidazolinone,
N,N'-di(phenylthio)urea,
N,N'-di(cyclohexylthio)urea,
N,N'-di(cyclooctylthio)urea,
N,N'-di(chlorophenylthio)urea,
N,N'-di(benzylthio)urea,
N,N'di(tolylthio)urea,
N,N'-di(t-butylthio)urea,
N,N'-di(isopropylthio)urea,
N-(cyclohexylthio)maleimide,
N-(cyclooctylthio)maleimide,
N-(phenylthio)maleimide,
N-(chlorophenylthio)maleimide,
N-(tolylthio)maleimide,
N-(nitrophenylthio)maleimide,
N-(benzylthio)maleimide,
N-(t-butylthio)maleimide,
N-(isopropylthio)maleimide,
cyclohexylthio-3-hydantoin,
1,3-bis(cyclohexylthio)hydantoin,
cyclooctylthio-3-hydantoin,
1,3-bis(cyclooctylthio)hydantoin,
cyclopentylthio-3-hydantoin,
cyclododecylthio-3-hydantoin,
1,3-bis(cyclododecylthio)hydantoin,
phenylthio-3-hydantoin,
1,3-bis(chlorophenylthio)hydantoin,
benzylthio-3-hydantoin,
1,3-bis(benzylthio)hydantoin,
tolylthio-3-hydantoin,
1,3-bis(tolylthio)hydantoin,
1,3-bis(isopropylthio)hydantoin,
5,5-dimethyl-3-(cyclohexylthio)hydantoin,
5,5-dimethyl-3-(cyclooctylthio)hydantoin,
5,5-dimethyl-3-(phenylthio)hydantoin,
5,5-dimethyl-3-(chlorophenylthio)hydantoin,
5,5-dimethyl-3-(benzylthio)hydantoin,
5,5-dimethyl-3-(tolylthio)hydantoin,
5,5-dimethyl-3-(nitrophenylthio)hydantoin,
5,5-dimethyl-3-(t-butylthio)hydantoin,
5,5-dimethyl-3-(isopropylthio)hydantoin,
1,4,5,6,7,7-hexachloro-N-(cyclohexylthio)bicyclo[2.2.1]hept-5-ene-2,3-dicarboximide,
1,4,5,6,7,7-hexachloro-N-(cyclooctylthio)bicyclo-[2.2.1]hept-5-ene-2,3-dicarboximide.
1,4,5,6,7,7-hexachloro-N-(phenylthio)bicyclo[2.2.1]hept-5-ene-2,3,-dicarboximide,
1,4,5,6,7,7-hexachloro-N-(chlorophenylthio)bicyclo[2.2.1]hept-5-ene-2,3-dicarboximide,
1,4,5,6,7,7-hexachloro-N-(benzylthio)bicyclo[2.2.1]hept-5-ene-2,3-dicarboximide,
1,4,5,6,7,7-hexachloro-N-(tolylthio)bicyclo[2.2.1]-hept-5-ene-2,3-dicarboximide,
1,4,5,6,7,7-hexachloro-N-(nitrophenylthio)bicyclo[2.2.1]hept-5-ene-2,3-dicarboximide,
1,4,5,6,7,7-hexachloro-N-(t-butylthio)bicyclo[2.2.1]hept-5-ene-2,3-dicarboximide,
1,4,5,6,7,7-hexachloro-N-(isopropylthio)bicyclo[2.2.1]hept-5-ene-2,3-dicarboximide,
N-(cyclohexylthio)-4-cyclohexene-1,2-dicarboximide,
N-(cyclooctylthio)-4-cyclohexene-1,2-dicarboximide,
N-(phenylthio)-4-cyclohexene-1,2-dicarboximide,
N-(chlorophenylthio)-4-cyclohexene-1,2-dicarboximide,
N-(benzylthio)-4-cyclohexene-1,2-dicarboximide,
N-(tolylthio)-4-cyclohexene-1,2-dicarboximide,
N-(nitrophenylthio)-4-cyclohexene-1,2-dicarboximide,
N-(t-butylthio)-4-cyclohexene-1,2-dicarboximide.

Examples of other compounds are 1,3-bis(cyclohexylthio)-2-benzimidazolinone,
1,3-bis(cyclooctylthio)-2-benzimidazolinone,
1,3-bis(phenylthio)-2-benzimidazolinone,
1,3-bis(cyclododecylthio)-2-benzimidazolinone,
1,3-bis(tolylthio)-2-benzimidazolinone, and mixtures thereof, 1,3-bis(m-tolylthio)-2-benzimidazolinone,
1-phenylthio-2-benzimidazolinone,
1-benzylthio-2-benzimidazolinone,
1-chlorophenylthio-2-benzimidazolinone,
1-nitrophenylthio-2-benzimidazolinone,
1-cyclohexylthio-2-benzimidazolinone,
1-cyclooctylthio-2-benzimidazolinone,
1-tolylthio-2-benzimidazolinone,
1-t-butylthio-2-benzimidazolinone,
1,3-bis(chlorophenylthio)-2-benzimidazolinone,
1,3-bis(benzylthio)-2-benzimidazolinone,
1,3-bis(nitrophenylthio)-2-benzimidazolinone,
1,3-bis(t-butylthio)-2-benzimidazolinone,
1,3-bis(isopropylthio)-2-benzimidazolinone,
N-phenylthio-3,4,5,6-tetrachlorophthalimide,
N-tolylthio-3,4,5,6-tetrachlorophthalimide,
N-chlorophenylthio-3,4,5,6-tetrachlorophthalimide,
N-benzylthio-3,4,5,6-tetrachlorophthalimide,
N-nitrophenylthio-3,4,5,6-tetrachlorophthalimide,
N-cyclohexylthio-3,4,5,6-tetrachlorophthalimide,
N-cyclooctylthio-3,4,5,6-tetrachlorophthalimide,
N-phenylthio-3,4,5,6-tetrabromophthalimide,
N-cyclohexylthio-3,4,5,6-tetrabromophthalimide, N-(ar-tolylthio)-3,4,5,6-tetrachlorophthalimide,
N-(ar-tolylthio)-3,4,5,6-tetrabromophthalimide,
N-(phenylthio)naphthalimide,
N-(tolylthio)naphthalimide,
N-(chlorophenylthio)naphthalimide,
N-(benzylthio)naphthalimide,
N-(nitrophenylthio)naphthalimide,
N-(cyclohexylthio)naphthalimide,
N-(cyclooctylthio)napthalimide, and N,N'-bis(ar-tolylthio)-1,2,4,5-benzenetetracarboxylic-1,2:4,5-diimide.

Further examples are 1,3-bis(cyclohexylthio)-2-imidazolidinone,
1,3-bis(cyclooctylthio)-2-imidazolidinone,
1,3-bis(cyclododecylthio)-2-imidazolidinone,
1,3-bis(phenylthio)-2-imidazolidinone,
1,3-bis(chlorophenylthio)-2-imidazolidinone,
1,3-bis(benzylthio)-2-imidazolidinone,
1,3-bis(tolylthio)-2-imidazolidinone,
1,3-bis(nitrophenylthio)-2-imidazolidinone,
1,3-bis(t-butylthio)-2-imidazolidinone,
1,3-bis(isopropylthio)-2-imidazolidinone,
N[(alpha-chlorocyclohexyl)thio]phthalimide,
N,N'-di(nitrophenylthio)urea,
N-(phenylthio)phthalimide,
N-(p-chlorophenylthio)phthalimide,
N-(o-tolythio)phthalimide,
N-(m-tolylthio)phthalimide,
N-(o-nitrophenylthio)phthalimide,
N-(p-chlorophenylthio)succinimide,
N-(o-tolylthio)succinimide,
N-(m-tolylthio)succinimide.
N-(p-tolylthio)succinimide,
N-(t-butylthio)succinimide,
N-(phenylthio)succinimide,
N-(nitrophenylthio)succinimide,
N-(benzylthio)succinimide,
N-[(trichloromethyl)thio]phthalimide.

Further examples of the compounds useful as premature vulcanization inhibitors in this invention are N-(naphthylthio)phthalimide,
N-(isopropylthio)succinimide,
N-(cyclohexylthio)succinimide,
and N-(cyclooctylthio)succinimide;
N-phenyl-N'-(phenylthio)urea,
N-phenyl-N'-(isopropylthio)urea,
N-phenyl-N'-(t-butylthio)urea,
N-phenyl-N'-(cyclohexylthio)urea,
N-phenyl-N'-(cyclooctylthio)urea,
N-methyl-N'-(phenylthio)urea,
N-ethyl-N'-(phenylthio)urea,
N-propyl-N'-(phenylthio)urea,
N-isopropyl-N'-(phenylthio)urea,
N-t-butyl-N'-(phenylthio)urea,
N-cyclooctyl-N'-(phenylthio)urea,
N-cyclohexyl-N'-(phenylthio)urea,
N-n-dodecyl-N'-(phenylthio)urea,
and variations thereof;

and N-(cyclododecylthio)succinimide.

The compositions of this invention are prepared by mixing the organic disulfide stabilizer with the sulfenamide accelerator-prevulcanization inhibitor in any convenient manner. Since in the manufacture of accelerator-inhibitor combinations it is necessary to blend the two components together, it is preferable in the practice of this invention to also blend the stabilizer into the mixture at the same time. Thereby, avoidance of another blending operation is achieved. It has been found that uniform blends of sulfenamide accelerator-prevulcanization inhibitor-disulfide stabilizer can be obtained using standard techniques known to those skilled in the art.

The ratios of accelerator-inhibitor in commercial mixtures are generally about 1:1 to 3:1, however, the practice of this invention is not limited thereto. Compositions of 5 to 95 parts of a thiazolesulfenamide accelerator and of 5 to 95 parts of a sulfenamide prevulcanization inhibitor are within the preferred range of the invention. Addition of as little as 0.1 part of sulfenamide prevulcanization inhibitor to 100 parts of sulfenamide accelerator exerts a significant stabilizing effect on the accelerator. The addition of 0.1 to 10 parts of stabilizer to 100 parts of accelerator-inhibitor mixture is effective in reducing the decomposition of the inhibitor in the blend. Preferably, 0.5 part to 5 parts stabilizer is used to 100 parts of accelerator-inhibitor composition.

Examples of some of the sulfenamide accelerators which can be used in this invention are:

N-cyclohexyl-2-benzothiazolesulfenamide,
N-cyclohexyl-5-chloro-2-benzothiazolesulfenamide,
N-tert-butyl-2-benzothiazolesulfenamide,
N-tert-butyl-4-methyl-2-benzothiazolesulfenamide,
N-tert-octyl-2-benzothiazolesulfenamide,
N-tert-octyl-6-ethoxy-2-benzothiazolesulfenamide,
2-(morpholinothio)benzothiazolesulfenamide,
2(2,6-morpholinothio)benzothiazolesulfenamide,
2(morpholinothio)-6-phenylbenzothiazolesulfenamide,
N,N-diethyl-2-benzothiazolesulfenamide,
N-methyl-N-ethyl-2-benzothiazolesulfenamide,
N,N-dipropyl-2-benzothiazolesulfenamide,
N,N-dibutyl-2-benzothiazolesulfenamide,
N,N-diisopropyl-2-benzothiazolesulfenamide,
N-ethyl-N-propyl-2-benzothiazolesulfenamide,
N,N-dicyclohexyl-2-benzothiazolesulfenamide,
N-methyl-N-benzyl-2-benzothiazolesulfenamide,
N,N-dibenzyl-2-benzothiazolesulfenamide,
2(piperidinothio)benzothiazolesulfenamide,
N,N-dimethyl-2-benzothiazolesulfenamide,
N-butyl-tetrahydrobenzothiazolesulfenamide,
N-ethyl-tetrahydrobenzothiazolesulfenamide,
N-cyclohexyl-tetrahydrobenzothiazolesulfenamide,
N-methyl-4-methylthiazolesulfenamide,
N-cyclohexyl-4-methylthiazolesulfenamide,
N-cyclohexyl-4-ethylthiazolesulfenamide,
N-cyclohexyl-4,5-dimethylthiazolesulfenamide,
N-isopropyl-4-methylthiazolesulfenamide,
thiazolesulfenamide,
N-cyclohexyl-2(6,7-dihydro-4,5-benzobenzothiazole)sulfenamide.

DESCRIPTION OF PREFERRED EMBODIMENTS

The effectiveness of the stabilizers of this invention to prevent consumption of prevulcanization inhibitors, called PVI in the tables, when mixed with sulfenamide accelerators was demonstrated by comparing the concentration of the prevulcanization inhibitor in an accelerator-inhibitor mixture to the prevulcanization inhibitor concentration in the same accelerator-inhibitor mixture to which stabilizer has been added. The prevulcanization inhibitor concentration was determined by chromatographic analysis.

The consumption of prevulcanization inhibitor increases with increasing temperature. Therefore, it is convenient to study the stability of the material at elevated temperatures because the test period is shortened; it was found that the higher temperature stability data correlates well with room temperature stability data.

In an example of this invention samples containing 50 parts of N-tert-butyl-2-benzothiazole and 50 parts of N-(cyclohexylthio)phthalimide were selected to demonstrate the invention. With portions of the same materials, duplicate compositions were prepared containing 50 parts of N-(cyclohexylthio)phthalimide, 48.5 parts of N-tert-butyl-2-benzothiazole, and 1.5 parts by weight of 2,2'-dithiobisbenzothiazole(2,2' - bisbenzothiazyl disulfide). The samples were maintained at various temperatures; and the concentration of the prevulcanization inhibitor, in this case, N-(cyclohexylthio)phthalimide, was determined at different intervals of time. The times and temperatures used were 16 hours at 70° C. and 7, 21, and 35 days at 50° C. The results are shown in Table I.

TABLE I

| Stabilizer | Percent PVI after— | | | |
|---|---|---|---|---|
| | 16 hrs. at 70° C. | Days at 50° C. | | |
| | | 7 | 21 | 35 |
| None | 44.0 | 44 | 27 | 11 |
| Benzothiazyl disulfide | 47.0 | 48 | 44 | 40 |
| None | 43.8 | 42 | 27 | 11 |
| Benzothiazyl disulfide | 47.1 | 46 | 41 | 38 |

The data indicates that in each case the addition of stabilizer resulted in higher concentrations of prevulcanization inhibitor remaining after the test period. In fact, after 35 days at 50° C. all the samples with stabilizer added had over three hundred percent more prevulcanization inhibitor remaining than the untreated samples. Notice that the 70° C. and 50° C. data each rate the relative stability of the samples in the same order which is indicative that the accelerated tests at elevated temperature are valid.

Normally, the compositions would be stored at room temperature, therefore, a sample as described above was stored at room temperature over several months. The results are given in Table II.

TABLE II

| Stabilizer | Percent PVI after months at room temperature— | | |
|---|---|---|---|
| | 3 | 5 | 9 |
| None | 42.5 | 41.0 | 10.7 |
| Benzothiazyl disulfide | 48.5 | 47.0 | 41.3 |

Here again is demonstrated the great effect the stabilizer additive has upon the conservation of the prevulcanization inhibitor. After nine months storage at room temperature the sample with the stabilizer additive still had over eighty percent of its original prevulcanization inhibitor concentration while the untreated sample had only slightly over twenty percent of the inhibitor remaining.

In another test only 0.5 part by weight of 2,2'-bisbenzothiazyl disulfide was added and the stability determined at 50° C. The effect of the small amount of stabilizer upon storage properties of the composition can be seen in Table III.

TABLE III

| Stabilizer | Percent PVI, days 50° C. | |
|---|---|---|
| | 7 | 21 |
| None | 40 | 23 |
| Benzothiazyl disulfide | 44 | 30 |

The data of Table III shows the storage characteristics of mixtures of sulfenamide accelerator and sulfenamide inhibitors of premature vulcanization and that 0.5% is sufficient to retard the decomposition of the PVI.

In another example of this invention 2.25 parts by weight of 2,2'-bisbenzothiazyl disulfide, 72.75 parts of N-tert-butyl-2-benzothiazolesulfenamide, and 25 parts of N-(cyclohexylthio)phthalimide were blended together, and accelerated stability data determined on the sample. A sample containing 75 parts of N-tert-butyl-2-benzothiazolesulfenamide and 25 parts of N-(cyclohexylthio)phthalimide was tested as the control. The concentration of the prevulcanization inhibitor in each case was 25%. The effect of the disulfide stabilizer has upon maintaining the inhibitor concentration can be seen in Table IV.

TABLE IV

| Stabilizer | Percent PVI | | |
|---|---|---|---|
| | 16 hrs. at 70° C. | Days at 50° C. | |
| | | 7 | 35 |
| None | 13 | 18 | 0 |
| Benzothiazyl disulfide | 16 | 19 | 12 |

Another example is a blend of 50 parts N-(cyclohexylthio)phthalimide, 48.5 parts of N-cyclohexyl-2-benzothiazolesulfenamide and 1.5 parts of 2,2'-bisbenzothiazyl disulfide which was compared with a 1:1 blend of the accelerator-PVI at 50° C. A comparison of the stability data is given in Table V.

TABLE V

| Stabilizer | Percent PVI, days at 50° C. | |
|---|---|---|
| | 7 | 21 |
| None | 43.2 | 23.2 |
| Benzothiazyl disulfide | 47.4 | 29.4 |

Samples containing 47.5 parts of N-tert-butyl-2-benzothiazolesulfenamide, 47.5 parts of N-(cyclohexylthio)phthalimide and 5 parts of disulfide stabilizer were heated at 70° C. for 16 hours. The assays found are tabulated in Table VI.

TABLE VI

| Stabilizer: | Percent PVI after 16 hours at 70° C. |
|---|---|
| None | 41.2 |
| Benzothiazyl disulfide | 44.2 |
| Benzyl disulfide | 42.9 |
| Ethyl disulfide | 42.7 |

A test on a sample containing 50 parts of N-(cyclohexylthio)phthalimide, 45 parts of N-tert-butyl benzothiazolesulfenamide, and 5 parts of phenyl disulfide stabilizer was aged at 70° C. for 16 hours. The PVI concentration was unchanged in the sample containing phenyl disulfide, whereas, an unstabilized sample containing no stabilizer contained only 47% PVI after the period of aging.

Three prevulcanization inhibitors were tested in a blend containing 48.5 parts N-tert-butyl-benzothiazolesulfenamide, 1.5 parts 2,2'-bisbenzothiazyl disulfide, and 50 parts of the PVI. They were compared with 1:1 blends containing no stabilizer. The results are shown in Table VII.

TABLE VII

| PVI | Percent PVI after 16 hours at 70° C. | |
|---|---|---|
| | Unstabilized | Stabilized |
| 1,3-diphenylthio-2-imidazolidinone | 42.1 | 45.3 |
| Cyclohexylthiotetrahydrophthalimide | 46.8 | 48.8 |
| N-(cyclohexylthio)succinimide | 45.3 | 47.7 |

The data shows in each case the stabilized sample after aging contains more PVI than the unstabilized samples.

Samples containing 47 parts N-tert-butyl-2-benzothiazolesulfenamide, 50 parts of N-(cyclohexylthio)phthalimide and 3 parts of stabilizer were heated at 70° C. for 40.5 hours. The stabilizers tested were benzothiazyl disulfide, benzyl disulfide, p-tolyl disulfide. In each case, the sample containing the stabilizer had more PVI remaining after the test period than an unstabilized sample.

A comparison of this data with data at shorter times indicates that lengthening of the storage period at elevated temperature results in a significant depletion of the prevulcanization inhibitor. It was noted that the benzothiazyl disulfide was the preferred stabilizer for N-(cyclohexylthio)phthalimide.

The stabilization of 2-(morpholinothio)benzothiazole PVI mixtures are shown in Table VIII. A 1:1 composition of 2-(morpholinothio)benzothiazole-N-(cyclohexylthio)phthalimide was compared to a composition containing 50 parts N-(cyclohexylthio)phthalimide, 47 parts 2-(morpholinothio)benzothiazole and 3 parts stabilizer. The PVI was more stable in the presence of this sulfenamide accelerator so the aging time was extended to 115.5 hours to achieve the degradation shown. The presence of stabilizer again shows a preservation effect upon the PVI which results in more PVI remaining at the end of the test period.

TABLE VIII

| Stabilizer: | Percent PVI after 115.5 hours at 70° C. |
|---|---|
| None | 45.1 |
| Benzothiazyl disulfide | 48.4 |
| Phenyl disulfide | 48.1 |

The preservation of N-(cyclohexylthio)-3,3-dimethyl glutarimide is shown in Table IX. A composition comprising 50 parts of the PVI, 47 parts N-tert-butyl-2-benzothiazolesulfenamide and 3 parts benzothiazyl disulfide are compared to a 1:1 composition of PVI-sulfenamide accelerator.

TABLE IX

| Stabilizer: | Percent PVI after 29.5 hours at 70° C. |
|---|---|
| None | 45.8 |
| Benzothiazyl disulfide | 49.8 |

In another test the PVI, N,N-diphenylthio acetamide, was stabilized in a mixture with N-tert-butyl benzothiazolesulfenamide by using 3.0 percent stabilizer based on the total weight of the PVI-accelerator mixture.

Although the invention has been illustrated by typical examples, it is not limited thereto. Changes and modifications of the examples of the invention herein chosen for purposes of disclosure can be made which do not constitute departure from the spirit and scope of the invention.

I claim:

1. A composition consisting essentially of a thiazolesulfenamide accelerator, a sulfenamide prevulcanization inhibitor, in an amount effective to inhibit prevulcanization, selected from the group consisting of the formulas:

(a)

wherein

is a radical derived by removal of hydrogen from an imide of a dicarboxylic acid, from a monocarbonyl cyclic urea, or from a monocarbonyl azole containing one other different hetero atom in the ring, and R is aryl, secondary alkyl, tertiary alkyl, or cycloalkyl, (b)

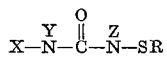

where X, Y, and Z individually are hydrogen, R, or SR, R having the same meaning as before, and (c)

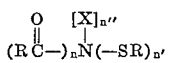

where $n$, $n'$, and $n''$ are integers, the sum of which is three, $n$ and $n'$ being one or two, and $n''$ being zero or one, and X having the same meaning as before, and R and X having the same meaning as before, and a stabilizing amount of an organic disulfide of the formula T—S—S—T wherein T independently is lower alkyl, aralkyl, aryl, alkenyl, or a 2-thiazolyl radical.

2. A composition consisting essentially of a thiazolesulfenamide accelerator, a sulfenamide prevulcanization inhibitor the characteristic nucleus of which is

in an amount effective to inhibit prevulcanization wherein

is a radical derived by removal of hydrogen from an imide of a dicarboxylic acid, from a monocarbonyl cyclic urea, or from a monocarbonyl azole containing one other different hetero atom in the ring, and R is aryl, secondary alkyl, tertiary alkyl, or cycloalkyl, and a stabilizing amount of an organic disulfide of the formula

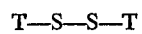

wherein T independently is lower alkyl, aralkyl, aryl, alkenyl, or a 2-thiazolyl radical.

3. A composition according to claim 2 wherein the prevulcanization inhibitor is N-(cyclohexylthio)phthalimide.

4. A composition according to claim 2 wherein the prevulcanization inhibitor is 1,3-diphenylthio-2-imidazolidinone.

5. A composition according to claim 2 wherein the prevulcanization inhibitor is cyclohexylthiotetrahydrophthalimide.

6. A composition according to claim 2 wherein the prevulcanization inhibitor is N-(cyclohexylthio)succinimide.

7. A composition according to claim 2 wherein the accelerator is N-tert-butyl-2-benzothiazolesulfenamide.

8. A composition according to claim 2 wherein the accelerator is N-cyclohexyl-2-benzothiazolesulfenamide.

9. A composition according to claim 2 wherein the accelerator is 2-(morpholinothio)benzothiazole.

10. A composition according to claim 2 wherein T is benzothiazyl.

11. A composition according to claim 2 wherein T is benzyl.

12. A composition according to claim 2 wherein T is ethyl.

13. A composition according to claim 2 wherein T is phenyl.

14. A composition according to claim 2 comprising from 5 to 95 parts of a thiazolesulfenamide accelerator, from 5 to 95 parts of a sulfenamide prevulcanization inhibitor and from 0.5 to 10 parts of an organic disulfide stabilizer of the formula T—S—S—T wherein T independently is lower alkyl, aralkyl, aryl, alkenyl, or a 2-thiazolyl radical.

15. A stabilized composition consisting essentially of 48.5 parts of N-tert-butyl-2-benzothiazolesulfenamide, 50.0 parts of N-(cyclohexylthio)phthalimide and 1.5 parts of benzothiazyl disulfide.

References Cited

UNITED STATES PATENTS

| 3,357,957 | 12/1967 | Bromby et al. | 260—780 |
| 3,473,667 | 10/1969 | Coran et al. | 260—780 |
| 3,513,139 | 5/1970 | Coran et al. | 260—780 |

RICHARD D. LOVERING, Primary Examiner

I. GLUCK, Assistant Examiner

U.S. Cl. X.R.

260—79.5B, 780, 784, 792

UNITED STATES PATENT OFFICE
CERTIFICATE OF CORRECTION

Patent No. 3,579,460    Dated May 18, 1971

Inventor(s) Joseph Edward Kerwood

It is certified that error appears in the above-identified patent and that said Letters Patent are hereby corrected as shown below:

Column 1, line 5, after "Akron, Ohio 44313" add "assignor to Monsanto Co., St. Louis, Mo., a corporation of Delaware"

Signed and sealed this 7th day of December 1971.

(SEAL)
Attest:

EDWARD M. FLETCHER, JR.
Attesting Officer

ROBERT GOTTSCHALK
Acting Commissioner of Patents